(12) United States Patent
Kikuchi et al.

(10) Patent No.: US 7,493,085 B2
(45) Date of Patent: Feb. 17, 2009

(54) REMOTE CONTROL TRANSMITTER APPARATUS

(75) Inventors: Kazunori Kikuchi, Kanagawa (JP); Akira Katsuyama, Kanagawa (JP)

(73) Assignee: Sony Corporation (JP)

( * ) Notice: Subject to any disclaimer, the term of this patent is extended or adjusted under 35 U.S.C. 154(b) by 361 days.

(21) Appl. No.: 11/483,867

(22) Filed: Jul. 10, 2006

(65) Prior Publication Data
US 2007/0159528 A1 Jul. 12, 2007

(30) Foreign Application Priority Data
Jul. 14, 2005 (JP) ............................ P2005-205073

(51) Int. Cl.
*H04B 7/00* (2006.01)
*G08C 19/00* (2006.01)
(52) U.S. Cl. .................................. 455/41.2; 340/825.72
(58) Field of Classification Search ............... 455/39, 455/41.1, 41.2, 41.3, 68, 70; 340/825.71, 340/825.72
See application file for complete search history.

(56) References Cited

U.S. PATENT DOCUMENTS

| | | | |
|---|---|---|---|
| 4,623,887 A | 11/1986 | Welles, II | |
| 4,905,279 A * | 2/1990 | Nishio | 340/825.72 |
| 5,175,538 A * | 12/1992 | Kurita | 340/825.69 |
| 5,481,252 A * | 1/1996 | Kwon et al. | 340/825.22 |
| 6,909,378 B1 * | 6/2005 | Lambrechts et al. | 340/825.22 |

FOREIGN PATENT DOCUMENTS

| | | |
|---|---|---|
| JP | 5-347785 A | 12/1993 |
| JP | 10-322782 A | 12/1998 |
| JP | 2944274 B2 | 6/1999 |
| JP | 2001-204089 A | 7/2001 |
| JP | 2001-268663 A | 9/2001 |
| WO | 93/15488 | 8/1993 |
| WO | 02/35301 | 5/2002 |

* cited by examiner

*Primary Examiner*—Quochien B Vuong
(74) *Attorney, Agent, or Firm*—Lerner, David, Littenberg, Krumholz & Mentlik, LLP

(57) ABSTRACT

A remote control transmitter apparatus includes a ROM configured to store a plurality of sets of control data for remotely controlling a plurality of types of electronic equipment, a nonvolatile memory having first and second storage areas, a set key configured to place the remote control transmitter apparatus into either a preset mode or a learning mode from a normal mode, a plurality of selection keys configured to select a specific type of electronic equipment to be remotely controlled, a learning key, a plurality of operation keys, a transmitter, and a receiver configured to receive control data from another remote control transmitter apparatus.

2 Claims, 7 Drawing Sheets

| KEY \ EQUIPMENT TYPE | TV | | | VTR | | | DVD RECORDER | | |
|---|---|---|---|---|---|---|---|---|---|
| | COMPANY A | COMPANY B | ... | COMPANY A | COMPANY C | ... | COMPANY B | COMPANY D | ... |
| K1 | D11 | D12 | ..... | D14 | D15 | ..... | D17 | D18 | ..... |
| K2 | D21 | D22 | ..... | D24 | D25 | ..... | D27 | D28 | ..... |
| ... | | | ..... | | | ..... | | | ..... |
| Ki | Di1 | Di2 | ..... | Di4 | Di5 | ..... | Di7 | Di8 | ..... |
| ... | | | ..... | | | ..... | | | ..... |
| Kn | Dn1 | Dn2 | ..... | Dn4 | Dn5 | ..... | Dn7 | Dn8 | ..... |

DTTBL

| KEY \ KEY | SA | SB | SC |
|---|---|---|---|
| K1 | D12 | D14 | D18 |
| K2 | D22 | D24 | D28 |
| ... | ... | ... | ... |
| Ki | Di2 | Di4 | Di8 |
| ... | ... | ... | ... |
| Kn | Dn2 | Dn4 | Dn8 |

RAMTBL

TV — SA
VTR — SB
DVD — SC

|  KEY \ KEY  | PA | PB | PC |
|---|---|---|---|
| K1 |  |  |  |
| K2 |  |  |  |
| ⋮ |  |  |  |
| Ki | Dx |  |  |
| ⋮ |  |  |  |
| Kn |  |  |  |

RWTBL

| PA | PB | PC |
|---|---|---|
| COMPANY B'S TV SET | COMPANY A'S VTR | COMPANY C'S DVD RECORDER |

RAMTBL

FIG.8

| KEY \ KEY | SA | SB | SC |
|---|---|---|---|
| K1 | D11 | | |
| K2 | D21 | | |
| ⋮ | ⋮ | | |
| Kn | Dn1 | | |

RWTBL

US 7,493,085 B2

REMOTE CONTROL TRANSMITTER APPARATUS

CROSS-REFERENCE TO RELATED APPLICATIONS

The present application claims priority from Japanese Patent Application No. JP 2005-205073 filed on Jul. 14, 2005, the disclosure of which is hereby incorporated by reference herein.

BACKGROUND OF THE INVENTION

1. Field of the Invention

The present invention relates to a remote control transmitter apparatus.

2. Description of the Related Art

[1] Multi-function Remote Control Transmitter Apparatus

Whereas remote control transmitters that come with electronic equipment such as TV (TeleVision) sets, VTRs (Video Tape Recorders) and DVD recorders are generally designed for exclusive with the accompanying equipment, some remote control transmitters are capable of dealing with multi-function applications. That is, a multi-function remote control transmitter apparatus may be programmed to control a plurality of types of electronic equipment. To implement its multi-function features, this type of remote control transmitter apparatus typically has a preset function and a learning function as described below.

[2-1] Preset Function

The preset function is a function that enables the multi-function remote control transmitter apparatus to act as an ordinary remote control transmitter for dedicated with each particular type of equipment. Illustratively, a multi-function remote control transmitter apparatus may be preset concurrently as a remote control transmitter for exclusive use with a company A's TV set, as a remote control transmitter for dedicated use with a company B's VTR, and so on.

When the preset function is used as described, the multi-function remote control transmitter apparatus typically works as follows: with TV control mode selected, pushing a "1" key on the apparatus selects channel 1 of the company A's TV set. At this point, the company B's VTR does not react to the key operation on the remote control transmitter apparatus. When VTR control mode is selected, pushing the "1" key on the apparatus selects channel 1 of the company B's VTR. This time, the company A's TV set does not respond to the key operation on the remote control transmitter apparatus.

In this manner, a single multi-function remote control transmitter apparatus having the preset function is capable of getting preset to control a plurality of types of equipment. There is no need to keep several exclusive-use remote control transmitters handy or to select the right one among them when a given piece of equipment is to be controlled.

[2-2] Learning Function

The learning function is a function that enables each of the operation keys on a user's multi-function remote control transmitter apparatus to be defined to represent the capability of a desired operation key function provided by a different remote control transmitter apparatus owned by the same user. Illustratively, where VTR control mode is in effect, the right and left arrow keys ((→) and (←)) may be assigned the function of raising and lowering the sound volume of a TV set respectively. In other words, some operation keys not used to operate the VTR may be appropriated for use as operation keys effective at reproduction on the VTR.

The learning function thus allows the user to reprogram his or her remote control transmitter apparatus in such a manner as to optimize convenience in handling the transmitter apparatus to control target equipment.

3-1-1 Structure for Implementing the Preset Function

FIGS. 5A and 5B outline control data (for use in remote control purposes) used to implement the preset function, as well as typical control processes involved. The control data shown in FIGS. 5A and 5B is assumed to be in effect when the multi-function remote control transmitter apparatus is arranged to act as dedicated remote control transmitters each for exclusive use with a TV set, a VTR, and a DVD recorder.

As shown in FIG. 5A, the multi-function remote control transmitter apparatus is furnished with a data table DTTBL as a data source for preset use, as well as control data for remotely controlling pieces of equipment that apply to the data table DTTBL. In the data table DTTBL, each column of cells corresponds to one set of remote control data for a single piece of electronic equipment.

More specifically, the data table DTTBL shows different types of electronic equipment (i.e., TV, VTR, DVD recorder) along with the names of the manufacturers (companies A, B, C, etc.) manufacturing the listed pieces of equipment in the row direction of the table, and operation keys K1 through Kn on the multi-function remote control transmitter apparatus in the column direction. The operation keys K1 through Kn illustratively include numeric keys (e.g., "1," "2," etc.), mode keys ("Play," "Stop," etc.), and arrow keys (↑, ↓, etc.).

It is assumed that operating the first key K1 on the remote control transmitter for exclusive use with company A's TV set triggers output of infrared rays modulated by a control data item D11. On that assumption, the control data item D11 is provided in the cell at the intersection of the column for company A's TV set and the row for the key K1 in the data table DTTBL.

Likewise, it is assumed that operating the second through the n-th keys K2 through Kn on the remote control transmitter for exclusive use with company A's TV set triggers output of infrared rays modulated by control data items D21 through Dn1, respectively. In such a case, the control data items D21 through Dn1 are provided in the cells at the intersections of the column for company A's TV set and each of the rows for the keys K2 through Kn in the data table DTTBL.

It is also assumed that operating an i-th key Ki (i=any one of 1 through n) on the remote control transmitter for exclusive use with company C's VTR triggers output of infrared rays modulated by a control data item Di5. In this case, the control data item Di5 is provided in the cell at the intersection of the column for company C's VTR and the row for the key Ki.

As described, the control data acquired from pushing an operation key on the remote control transmitter for exclusive use with a given type of electronic equipment is placed into those cells in the data table DTTBL which correspond to the electronic equipment in question and to the pushed operation key. If the exclusive-use remote control transmitter does not have any key corresponding to the operation key Ki on the multi-function remote control transmitter apparatus, then the corresponding cell in the data table DTTBL is furnished with dummy control data.

The multi-function remote control transmitter apparatus further includes a data table RAMTBL that can be rewritten for preset use as shown in FIG. 5B, as well as equipment type selection keys SA, SB, and SC as indicated in FIG. 5C. Any one of the equipment type selection keys SA, SB, and SC is operated to switch between the TV set, VTR, and DVD recorder in order to select the desired equipment type for control by the multi-function remote control transmitter apparatus.

The data table RAMTBL has cells in "n" rows and three columns. Each column of the table corresponds to one set of remote control data for one type of electronic equipment. More specifically, the columns correspond to the equipment type selection keys SA, SB and SC, and the rows correspond to the operation keys K1 through Kn.

[3-1-2] Presetting Procedure

Below is a description of the procedure in steps for presetting the multi-function remote control transmitter apparatus. In this example, the equipment type selection keys SA, SB, and SC are preset to represent the operation keys of the remote control transmitters for exclusive use with company B's TV set, company A's VTR, and company D's DVD recorder, respectively.

The steps of the presetting procedure are as follows:

(1) The multi-function remote control transmitter apparatus is placed into preset mode by pushing a set key on the apparatus.

(2) The equipment type selection key SA is pushed.

(3) Company B's TV set is designated by performing a suitable key operation. Carrying out this step copies control data items D12 through Dn2 about company B's TV set from the data table DTTBL into the cells of the first column in the data table RAMTBL. Thereafter, the multi-function remote control transmitter apparatus terminates its preset mode and returns to normal mode.

(4) The steps (1) through (3) above are repeated for each of the other equipment type selection keys SB and SC.

Executing the above procedure copies the control data items D12 through Dn2, D14 through Dn4, and D18 through Dn8 from the data table DTTBL into the cells of the first through the third columns, respectively, in the data table RAMTBL.

Thereafter, when any one of the equipment type selection keys SA through SC is selectively operated, the multi-function remote control transmitter apparatus is set to serve as a remote control transmitter for exclusive use with the corresponding equipment type, as will be described below.

[3-1-3] Remote Control Operations Performed when what has been Preset is Put to Use For example, pushing the operation key K1 with the equipment type selection key SA held down retrieves the control data item D12 from the cell at the intersection of the column for the selection key SA and the row for the operation key K1 in the data table RAMTBL. Infrared rays modulated by the retrieved control data item D12 are output. As a result, company B's TV set is remotely controlled in the same manner as when the first operation key is pushed on its exclusive-use remote control transmitter, illustratively selecting channel 1.

Once the equipment type selection key SA is pushed, it remains effective unless and until another equipment type selection key SB or SC is operated. Pushing an operation key Ki next retrieves a control data item Di2 corresponding to the equipment type selection key SA from the data table RAMTBL and triggers output of infrared rays modulated by the retrieved control data item Di2. As a result, company B's TV set is remotely controlled in the same manner as when the i-th operation key is pushed on the remote control transmitter for exclusive use with the TV set.

Likewise, pushing the operation key Ki with the equipment type selection key SB or SC held down allows the VTR or DVD recorder to be remotely controlled in the same manner as when the i-th operation key is pushed on the remote control transmitter for exclusive use with the equipment in question.

In the manner described above, the multi-function remote control transmitter apparatus works as a remote control transmitter for dedicated use with relevant equipment in accordance with the equipment type selection key SA, SB or SC that has been pushed selectively.

[3-2-1] Structure for the Learning Function

FIGS. 6A and 6B outline control data used to implement the learning function as well as typical control processes involved. The example depicted by FIGS. 6A and 6B is one in which up to three sets of control data may be learned.

The multi-function remote control transmitter apparatus is furnished with a data table RWTBL that can be rewritten for learning use as shown in FIG. 6A, as well as three learning keys PA, PB, and PC as indicated in FIG. 6B. The data table RWTBL has cells in "n" rows and three columns. Each column of the table corresponds to one set of remote control data. More specifically, the columns correspond to the learning keys PA, PB and PC, and the rows correspond to the operation keys K1 through Kn. Furthermore, the multi-function remote control transmitter apparatus is equipped with an infrared photosensor.

[3-2-2] Learning Procedure

Below is a description of the procedure in steps for getting the multi-function remote control transmitter apparatus to learn the functions of operation keys on the remote control transmitter for exclusive use with a given type of equipment. The steps of the learning procedure are as follows:

(A) The photosensor of the multi-function remote control transmitter apparatus is positioned opposite to an infrared emitter of the remote control transmitter from which to learn remote control operations.

(B) The set key on the multi-function remote control transmitter apparatus is pushed in the same manner as in the step (1) above.

(C) The learning key PA is pushed.

(D) Of the operation keys on the multi-function remote control transmitter apparatus, an operation key Ki is pushed as the key on which the assigned remote control operation is desired to be changed.

(E) Of the operation keys on the exclusive-use remote control transmitter, an operation key Kx is pushed as the key from which the assigned remote control operation is desired to be learned. This triggers output of infrared rays modulated by a control data item Dx that represents the function to be learned and that corresponds to the operation key Kx. The multi-function remote control transmitter apparatus receives the output infrared rays and retrieves the control data item Dx from the received rays. The retrieved control data item Dx is written to that cell in the data table RWTBL which is located at the intersection between the column for the learning key PA pushed in the step (C) above and the row for the operation key Ki pushed in the step (D). Thereafter, the multi-function remote control transmitter apparatus terminates its learning mode and returns to normal mode.

The steps above apply likewise to the other learning keys PB and PC. Thereafter, when any one of the learning keys PA through PC is selectively operated, the multi-function remote control transmitter apparatus is set to serve as a remote control transmitter executing the newly assigned function, as will be described below.

[3-2-3] Remote Control Operations Performed when what has been Learned is Put to Use For example, pushing the operation key Ki with the learning key PA held down on the multi-function remote control transmitter apparatus retrieves the control data item Dx from the corresponding cell in the data table RWTBL and triggers output of infrared rays modulated by the retrieved control data item Dx. As a result, the electronic equipment whose exclusive-use remote control transmitter was subjected to the learning process receives the control data item Dx from the multi-function remote control transmitter apparatus and is remotely controlled thereby.

In like manner, it is possible to submit the remaining learning keys PB and PC and operation keys K1 through Kn to the learning process. The remote control operations thus learned are later carried out as programmed. The foregoing paragraphs have discussed the steps and processes involved in implementing the learning function.

[4] Others

On some multi-function remote control transmitter apparatus, the preset function (discussed in the subsections 3-1-1 through 3-1-3) may be implemented by writing to the data table RAMTBL the data identifying each particular type of electronic equipment to be remotely controlled in association with a specific equipment type selection key (one of SA through SC) reserved as the key for, say, company B's TV set. In such a case, pushing illustratively the operation key K1 with the equipment type selection key SA held down retrieves from the data table RAMTBL the data about company B's TV set. The action of the operation key K1 together with the retrieved data causes the control data item D11 to be retrieved from the data table DTTBL, whereby the equipment in question is remotely controlled.

The above-described techniques are disclosed illustratively in Japanese Patent No. 2944274.

Where the above-described learning function is in use, iterations of the learning process may result in having the control data items D11 through Dn1 written to the column corresponding to the learning key PA in the data table RWTBL as shown in FIG. 8. This is an exact match with the control data items D11 through Dn1 about company A's TV set in the data table DTTBL in FIG. 5A.

However, the control data items D11 through Dn1 in the data table RWTBL resulting from the learning process could also be copied from the data table DTTBL into the data table RAMTBL for remote control purposes. In other words, the learning-use data table RWTBL in this case is occupied wastefully. That translates into unproductively reducing the number of cells that should be made available for learning purposes in the data table RWTBL. The same applies to the learning keys PB and PC.

SUMMARY OF THE INVENTION

The present invention has been made in view of the above circumstances and provides arrangements for overcoming the above and other deficiencies of the related art while improving significantly on some existing techniques.

In carrying out the present invention and according to one embodiment thereof, there is provided a remote control transmitter apparatus including a ROM configured to store a plurality of sets of control data for remotely controlling a plurality of types of electronic equipment; a nonvolatile memory having first and second storage areas; a set key configured to place the remote control transmitter apparatus into either a preset mode or a learning mode from a normal mode; a plurality of selection keys configured to select a specific type of electronic equipment to be remotely controlled; a learning key; a plurality of operation keys; a transmitter; and a receiver configured to receive control data from another remote control transmitter apparatus, wherein, with the preset mode in effect and with one of the plurality of selection keys operated, performing a predetermined key operation causes one of the plurality of sets of control data corresponding to the predetermined key operation to be copied into a storage region in the first storage area which corresponds to the operated selection key; with the learning mode in effect, operating one of the plurality of operation keys causes the control data received by the receiver to be stored into a storage region in the second storage area which corresponds to the operated operation key; one set of control data stored in the second storage area is compared with the plurality of sets of control data stored in the ROM; if the comparison reveals a mismatch between the one set of control data stored in the second storage area and the plurality of sets of control data stored in the ROM, the remote control transmitter apparatus is returned to the normal mode; if the comparison reveals a match between the one set of control data stored in the second storage area and one of the plurality of sets of control data stored in the ROM, the one set of control data stored in the second storage area is replaced by the matching set of control data stored in the ROM; the one set of control data stored in the second storage area is cleared therefrom and the remote control transmitter apparatus is returned to the normal mode; with the normal mode in effect, operating one of the plurality of operation keys causes the control data copied into the storage region in the first storage area and corresponding to the operated selection key and to the operated operation key to be retrieved; and the transmitter transmits the retrieved control data to the specific type of electronic equipment to be remotely controlled.

According to the present invention, if the control data resulting from a learning process is found to be the same as the control data in a data table for preset purposes, the learned data is replaced by the matching preset data. A memory area accommodating the learned data is then cleared. This translates into an appreciable saving of the memory area used for learning so that the learning process is performed more effectively than before. There is no need to perform operations to delete the learned control data that has become unnecessary.

BRIEF DESCRIPTION OF THE DRAWINGS

Further objects and advantages of the present invention will become apparent upon a reading of the following description and appended drawings in which:

FIG. 7 is another data table explanatory of the present invention; and

FIG. 8 is another data table explanatory of the present invention.

DETAILED DESCRIPTION

[1] A Typical Structure of the Remote Control Transmitter Apparatus

Figure 1:
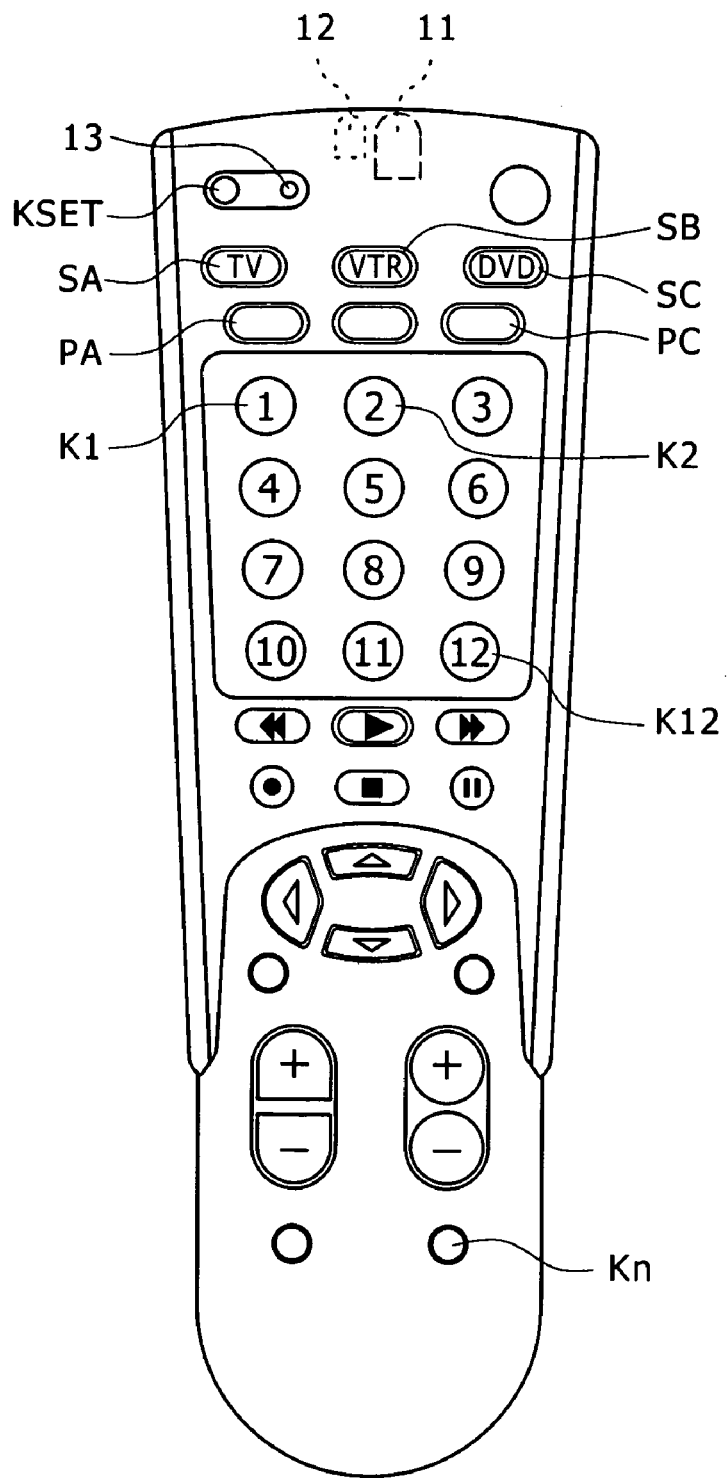
FIG. 1 is a plan view showing an appearance of an embodiment of the present invention.
Figure 2:
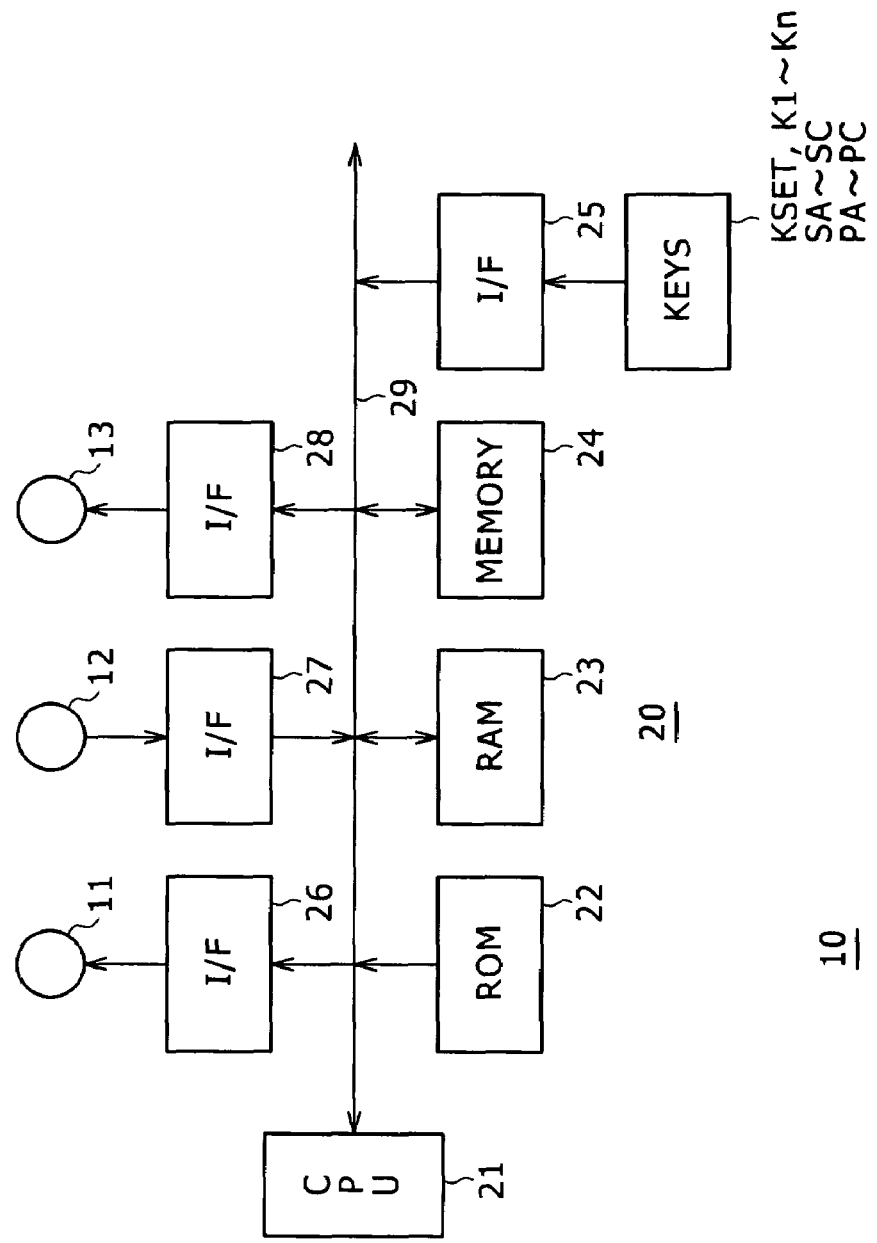
FIG. 2 is a schematic flow diagram of the embodiment.

FIG. 1 is a plan view showing an appearance of a multi-function remote control transmitter apparatus 10 embodying the present invention, and FIG. 2 is a schematic flow diagram showing a typical circuit as part of the apparatus. The remote control transmitter apparatus 10 of this example is designed remotely to control a TV set, a VTR and a DVD recorder as discussed earlier. Remote control operations are effected by use of infrared rays.

As shown in FIG. 1, the remote control transmitter apparatus 10 has an elongated, approximately rectangular shape. In the middle of the front end of the apparatus 10 (i.e., on the upper edge as seen in FIG. 1) are an infrared LED (Light Emitting Diode) 11 and an infrared photosensor 12. On the top surface of the apparatus 10 toward its front end are a set key KSET and an indicator LED 13. The top surface of the apparatus 10 is also furnished with equipment type selection keys SA through SC, learning keys PA through PC, and operation keys K1 through Kn.

With the remote control transmitter apparatus 10 in operation, the infrared LED 11 converts a signal representing a remote control operation into infrared rays for output. When control data is to be learned from another remote control transmitter apparatus, the infrared photosensor 12 receives the infrared rays coming from the other apparatus and outputs a remote control signal derived from the received rays. The indicator LED 13 indicates the result of a key operation in preset mode or in learning mode.

As shown in FIG. 2, the remote control transmitter apparatus 10 has a microcomputer 20 constituting a signal generation circuit and a control circuit. The microcomputer 20 includes a CPU (Central Processing Unit) 21 that executes diverse programs, a ROM (Read Only Memory) 22 that has programs and data stored therein, a RAM (Random Access Memory) 23 that serves as a work area, and a memory 24 that accommodates data tables. The memories 22 through 24 are connected to the CPU 21 via a system bus 29.

Figure 3:
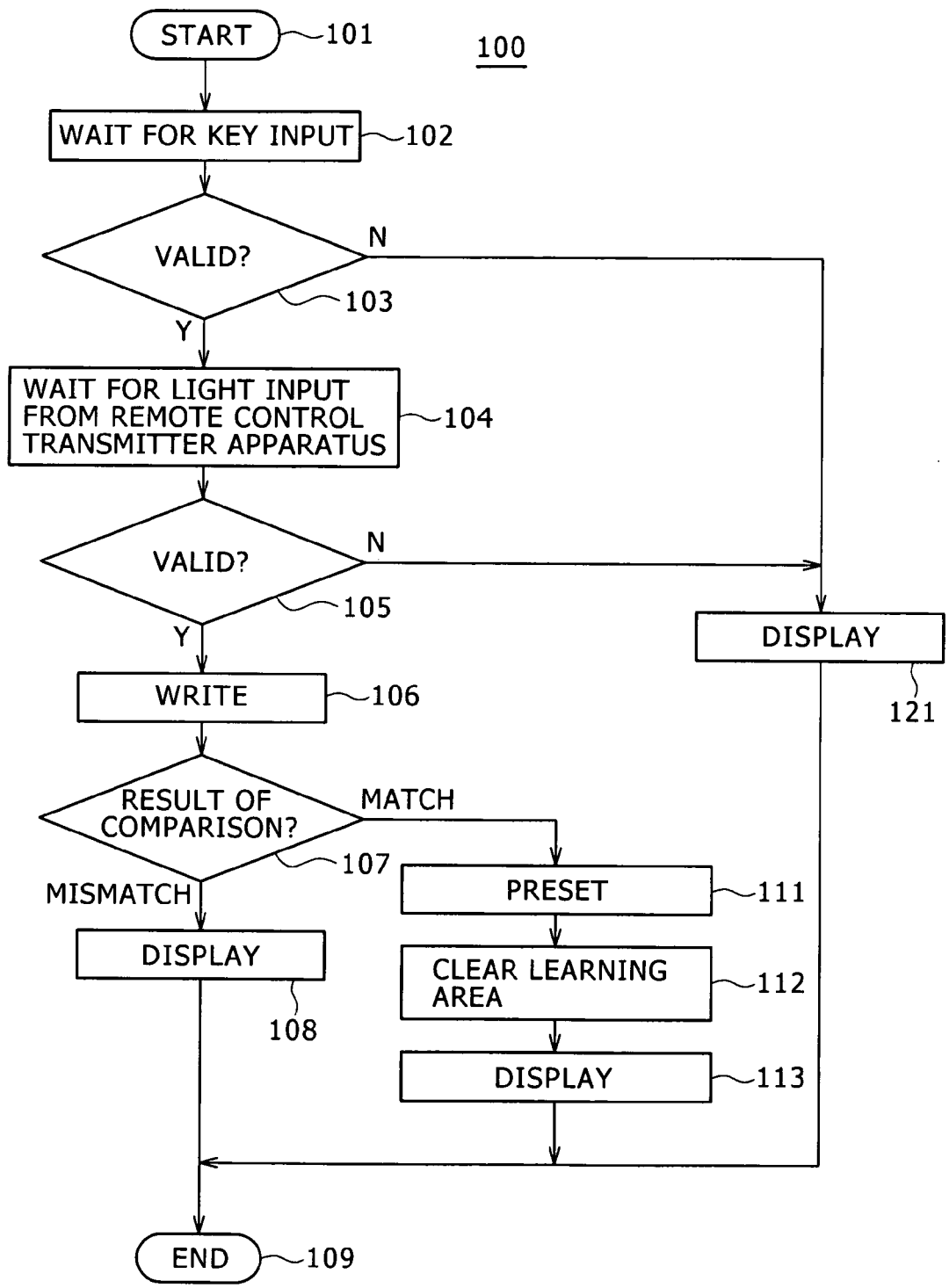
FIG. 3 is a flowchart of steps showing how the embodiment typically works.

The ROM 22 in this setup contains a routine 100 such as one shown in FIG. 3 as one of the programs executed by the CPU 21. The routine 100, which pertains to the present invention, will be discussed later in detail. In FIG. 3, only the major steps related to this invention are outlined.

Figures 5A, 5B, 5C:
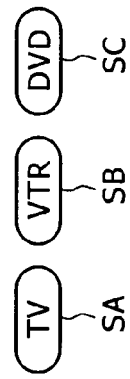
FIGS. 5A, 5B and 5C are other data tables and a schematic view explanatory of the present invention.

The ROM 22 retains the control data used to preset the remote control transmitter apparatus. The control data is prepared illustratively in the form of a data table DTTBL as shown in FIG. 5A. The data table and its contents were discussed above in connection with the related art.

Figures 6A, 6B:
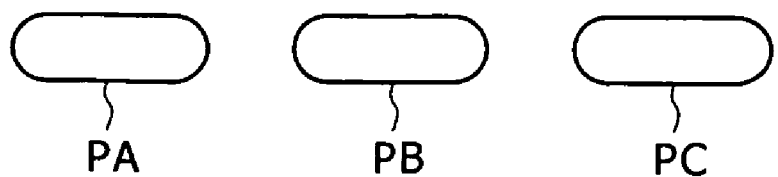
FIGS. 6A and 6B are another data table and a schematic view explanatory of the present invention.

The memory 24 may be a nonvolatile memory such as a flash memory or a CMOS (Complementary Metal Oxide Semiconductor) memory backed up by batteries or by a large-capacitance capacitor, not shown. The memory 24 illustratively retains a data table RAMTBL as a storage area for storing preset control data as shown in FIG. 5B, and a data table RWTBL as a storage area for accommodating learned control data as indicated in FIG. 6A.

The set key KSET, equipment type selection keys SA through SC, learning keys PA through PC, and operation keys K1 through Kn are constituted by nonlocking type push switches. The output from these switches is sent to the CPU 21 via an interface circuit 25.

The infrared LED 11, infrared photosensor 12 and indicator LED 13 are connected to the system bus 29 via interface circuits 26 through 28. Given control data representing a remote control operation from the CPU 21, the interface circuit 26 modulates a suitable carrier signal by the control data based on a predetermined modulation method such as PWM (Pulse Width Modulation), and forwards the modulated signal to the infrared LED 11. The interface circuit 27 demodulates the signal coming from the infrared photosensor 12 into the original control data and supplies the data to the CPU 21.

[2] Operation of the Remote Control Transmitter Apparatus

[2-1] Normal Mode (Remote control Transmitter Apparatus in Normal Operation)

In this case, of the operation keys K1 through Kn, an operation key Ki representing the remote control operation to be carried out is pushed. If the most-recently pushed key is one of the equipment type selection keys SA through SC among other keys (including the keys PA through PC), then the control data corresponding to the last-pushed equipment type selection key and to the operation key Ki is retrieved from the data table RAMTBL (FIG. 5B) in the memory 24 as described above in 3-1-3. The retrieved control data is fed to the interface circuit 26. The infrared LED 11 then outputs infrared rays modulated by the control data, thereby remotely controlling the targeted electronic equipment in a manner corresponding to the operation key Ki.

If the most-recently pushed key is one of the learning keys PA through PC among other keys (including the keys SA through SC), then the control data corresponding to the last-pushed learning key and to the operation key Ki is retrieved from the data table RWTBL (FIG. 6A) in the memory 24 as described above in 3-2-3. The retrieved control data is supplied to the interface circuit 26. The infrared LED 11 then outputs infrared rays modulated by the control data, thereby remotely controlling the targeted electronic equipment in a manner corresponding to the operation key Ki.

[2-2] Preset Mode (Execution of Preset)

In this case, the set key KSET is held down illustratively for three seconds. This places the remote control transmitter apparatus 10 into preset mode as in the step (1) described above in 3-1-2. Then the step (2) above and subsequent steps are carried out to preset desired remote control operations.

[2-3] Learning Mode (Execution of Learning)

In this case, as described above in the step (A) in 3-2-2, the photosensor 12 of the remote control transmitter apparatus 10 is first positioned opposite to an infrared emitter of the remote control transmitter from which to learn a desired remote control operation. The set key KSET is then held down illustratively for three seconds. This places the remote control transmitter apparatus 10 into learning mode as in the step (B) described above in 3-2-2. Thereafter, one of the learning keys PA through PC is pushed as in the step (C) above.

The step (D) above and subsequent steps are carried out to learn the desired remote control operation. These steps are performed illustratively by the routine 100, as described below. In the ensuing description, it is assumed that the learning key PA is used for the learning process.

The set key is pushed as in the step (B) above, before the learning key PA is pushed as in the step (C). This causes the CPU 21 to start the routine 100 in step 101. In step 102, the CPU 21 wais for key input. In step 102, as in the step (D)

above, an operation key Ki among the operation keys K1 through Kn on the remote control transmitter apparatus 10 is pushed as the key to which the learned remote control operation is desired to be assigned. In step 103, the CPU 21 checks to determine whether or not the key input in step 102 is valid. In this case the operation key Ki is found valid, so that step 103 is followed by step 104. In step 104, the CPU 21 waits for the input of infrared rays from the opposite remote control transmitter apparatus from which to learn the remote control operation.

Of the operation keys on the opposite remote control transmitter apparatus, an operation key Kx is pushed as the key from which the remote control operation is desired to be learned. This causes the infrared rays to be modified by the control data item Dx corresponding to the pushed key Kx and output by the opposite remote control transmitter apparatus. The output infrared rays are received by the photosensor 12 and subjected to a demodulation process whereby the original control data item Dx is acquired. The acquired control data item Dx is output from the interface circuit 27.

Step 104 is followed by step 105. In step 105, the CPU 21 checks to determine whether or not the control data item Dx output from the interface circuit 27 is valid. In this case the control data item Dx is found valid, so that step 105 is followed by step 106.

In step 106, the control data item Dx input in step 104 is written to that cell in the learning-use data table RWTBL which is located at the intersection between the column corresponding to the learning key PA that was operated to start the routine 100 on the one hand, and the row corresponding to the operation key Ki operated in step 102 on the other hand.

Figure 4A:
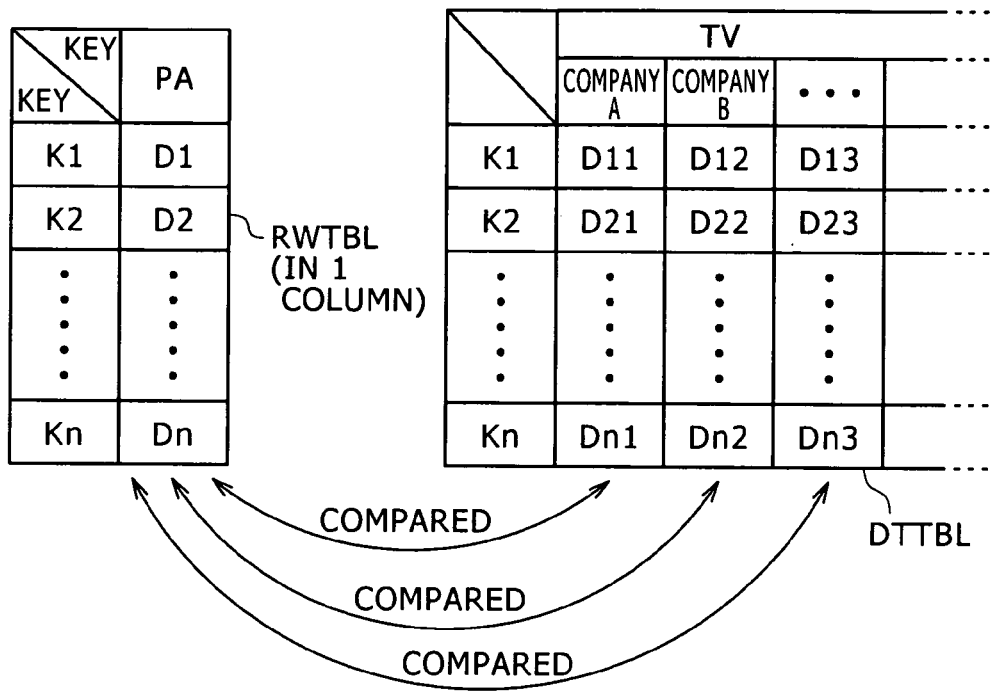
FIGS. 4A and 4B are data tables explanatory of the present invention.
Figure 4B:
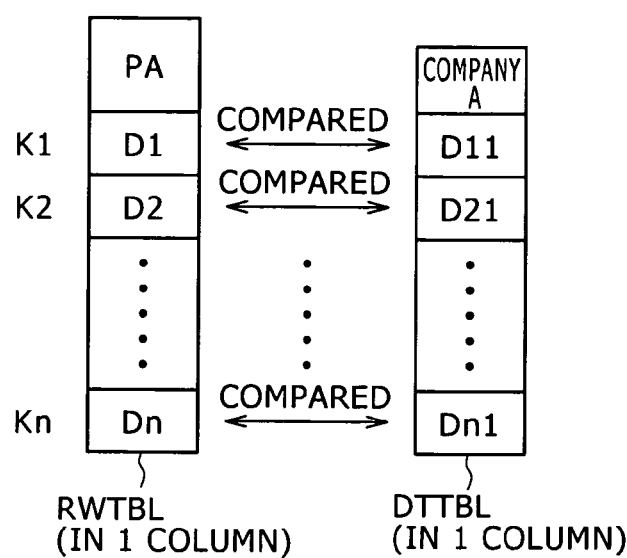

In step 107, the control data in the cells of the column corresponding to the learning key PA in the learning-use data table RWTBL is compared with the control data in each of the columns in the data table DTTBL as depicted in FIGS. 4A and 4B. In the case of FIGS. 4A and 4B, the control data items D1 through Dn are registered in the cells of the column corresponding to the learning key PA.

As shown in FIG. 4A, one column of control data items D1 through Dn registered on the learning key PA is compared with each of the columns of control data in the data table DTTBL. That is, the comparison starts with the first row of control data items D11 through Dn1 in the data table DTTBL, followed by the second row of control data items D12 through Dn2, the third row of control data items D13 through Dn3, etc., and finally the last row of control data items in the data table DTTBL.

When two columns of data are thus compared with each other, only the cells in the same row are matched against each other as shown in FIG. 4B. For example, the control data item Di in the data table RWTBL is compared with the control data item Di1 in the data table DTTBL.

If the comparison results in even a single mismatch, control is passed from step 107 to step 108. In step S108, the indicator LED 13 is illustratively lit green. The glowing LED indicates that the remote control operation transferred from the opposite remote control transmitter apparatus has been learned correctly. Thereafter, control is passed on to step 109 in which the CPU 21 terminates the routine 100 and leaves learning mode to return to normal mode.

If, as a result of the comparison in step 107, one column of all control data items D1 through Dn registered on the learning key PA is found to match a given column (j-th column) of control data items D1j through Dnj in the data table DTTBL, then step 107 is followed by step 111. In step 111, the control data items D1j through Dnj in the matching column are copied into the cells of the column corresponding to the equipment type selection key SA in the data table RAMTBL. That is, the control data items D1j through Dnj in the matching column are preset on the equipment type selection key SA.

In step 112, the contents in the cells of the column corresponding to the learning key PA are all cleared from the data table RWTBL. In step S113, the indicator LED 13 is illustratively lit orange to indicate that the learned result has been preset on the equipment type selection key PA. Thereafter, the CPU 21 reaches step 109 and terminates the routine 100.

If in step 103 the key input in step 102 is found invalid, control is passed from step 103 to step 121. If the control data item Dx output by the interface circuit 27 in step 104 is found invalid in step 105, control is passed from step 105 to step 121. In step 121, the indicator LED 13 illustratively blinks red to show that the input has been erroneous. Then the CPU 21 goes to step 109 and terminates the routine 100.

As described, in the case of a match between the learned control data and one column of control data in the data able DTTBL, step 111 is executed so as to preset the control data equivalent to the learned result onto the equipment type selection key SA upon retrieval from the data table DTTBL. Step 112 is then carried out to clear the learned control data from the data table RWTBL. That means the cells of the column corresponding to the learning key PA are left unused. The same applies to the other learning keys PB and PC.

According to the above-described multi-function remote control transmitter apparatus 10, the data table RWTBL for learning purposes is not consumed wastefully. As a result, the reduction of available cells in the learning-use data table RWTBL is minimized.

[3] Conclusion

The inventive remote control transmitter apparatus 10 discussed above substitutes preset data for learned control data if the latter is found equal to what is prepared in the data table DTTBL for preset purposes. In that case, the memory area for the learned result is cleared from the data table RWTBL. This translates into a significant saving of the memory area used for learning so that the learning process is performed more effectively than before. There is no need to carry out particular operations to delete the learned control data that has become unnecessary.

[4] Others

Although the description above contains many specificities, these should not be construed as limiting the scope of the invention but as merely providing illustrations of the presently preferred embodiments of this invention. It is to be understood that changes and variations may be made without departing from the spirit or scope of the claims that follow. For example, although the control data to be preset was shown prepared in the form of the data table DTTBL in the foregoing description, this is not limitative of the invention. Alternatively, individual control data items may be prepared without being organized in tabular or any other specific fashion. As another alternative, the learning keys PA through PC may double as the equipment type selection keys SA through SC, switched over functionally by operation of an appropriate switch. As a further alternative, only one learning key may be provided. It may then be arranged that every time this learning key is pushed, the assigned key functions are switched cyclically as if the learning keys PA through PC were pushed one by one.

Thus the scope of the present invention should be determined by the appended claims and their legal equivalents, rather than by the examples given.

The invention claimed is:

1. A remote control transmitter apparatus, comprising:
a ROM configured to store a plurality of sets of control data for remotely controlling a plurality of types of electronic equipment;
a nonvolatile memory having first and second storage areas;
a set key configured to place the remote control transmitter apparatus into either a preset mode or a learning mode from a normal mode;
a plurality of selection keys configured to select a specific type of electronic equipment to be remotely controlled;
a learning key;
a plurality of operation keys;
transmitter; and
a receiver configured to receive control data from another remote control transmitter apparatus, wherein
with the preset mode in effect and with one of the plurality of selection keys operated, performing a predetermined key operation causes one of the plurality of sets of control data corresponding to the predetermined key operation to be copied into a storage region in the first storage area which corresponds to the operated selection key,
with the learning mode in effect, operating one of the plurality of operation keys causes the control data received by the receiver to be stored into a storage region in the second storage area which corresponds to the operated operation key,
one set of control data stored in the second storage area is compared with the plurality of sets of control data stored in the ROM,
if the comparison reveals a mismatch between the one set of control data stored in the second storage area and the plurality of sets of control data stored in the ROM, the remote control transmitter apparatus is returned to the normal mode,
if the comparison reveals a match between the one set of control data stored in the second storage area and one of the plurality of sets of control data stored in the ROM, the one set of control data stored in the second storage area is replaced by the matching set of control data stored in the ROM,
the one set of control data stored in the second storage area is cleared from the second storage area and the remote control transmitter apparatus is returned to the normal mode,
with the normal mode in effect, operating one of the plurality of operation keys causes the control data copied into the storage region in the first storage area and corresponding to the operated selection key and to the operated operation key to be retrieved, and
the transmitter transmits the retrieved control data to the specific type of electronic equipment selected by the operated selection key.

2. A remote control method for use with a remote control transmitter apparatus including a ROM configured to store a plurality of sets of control data for remotely controlling a plurality of types of electronic equipment; a nonvolatile memory having first and second storage areas; a set key configured to place the remote control transmitter apparatus into either a preset mode or a learning mode from a normal mode; a plurality of selection keys configured to select a specific type of electronic equipment to be remotely controlled; a learning key; a plurality of operation keys; a transmitter; and a receiver configured to receive control data from another remote control transmitter apparatus, the remote control method comprising:
if a predetermined key operation is performed with the preset mode in effect and with one of the plurality of selection keys operated, causing one of the plurality of sets of control data corresponding to the predetermined key operation to be copied into a storage region in the first storage area which corresponds to the operated selection key;
if one of the plurality of operation keys is operated with the learning mode in effect, causing the control data received by the receiver to be stored into a storage region in the second storage area which corresponds to the operated operation key;
comparing one set of control data stored in the second storage area with the plurality of sets of control data stored in the ROM,
if the comparing step reveals a mismatch between the one set of control data stored in the second storage area and the plurality of sets of control data stored in the ROM, then returning the remote control transmitter apparatus to the normal mode;
if the comparing step reveals a match between the one set of control data stored in the second storage area and one of the plurality of sets of control data stored in the ROM, then replacing the one set of control data stored in the second storage area by the matching set of control data among the plurality of sets of control data stored in the ROM;
clearing the one set of control data from the second storage area and returning the remote control transmitter apparatus to the normal mode;
if one of the plurality of operation keys is operated with the normal mode in effect, retrieving the control data copied into the storage region in the first storage area and corresponding to the operated selection key and to the operated operation key; and
transmitting the retrieved control data to the specific type of electronic equipment selected by the operated selection key.

* * * * *